United States Patent
Krolo

(10) Patent No.: US 11,760,413 B2
(45) Date of Patent: Sep. 19, 2023

(54) AXLE SUPPORT WITH DEVICE FOR POSITIONING A STEERING GEAR

(71) Applicant: Autotech Engineering Deutschland GmbH, Bielefeld (DE)

(72) Inventor: Mario Krolo, Steinhagen (DE)

(73) Assignee: Autotech Engineering Deutschland GmbH, Bielefeld (DE)

( * ) Notice: Subject to any disclaimer, the term of this patent is extended or adjusted under 35 U.S.C. 154(b) by 830 days.

(21) Appl. No.: 16/658,758

(22) Filed: Oct. 21, 2019

(65) Prior Publication Data

US 2020/0140008 A1 May 7, 2020

(30) Foreign Application Priority Data

Nov. 6, 2018 (EP) ..................................... 18204483

(51) Int. Cl.
*B62D 21/09* (2006.01)
*B62D 7/02* (2006.01)
(Continued)

(52) U.S. Cl.
CPC .............. *B62D 7/023* (2013.01); *B62D 21/09* (2013.01); *B62D 21/11* (2013.01); *B62D 21/155* (2013.01)

(58) Field of Classification Search
CPC . B62D 3/12; B62D 7/00; B62D 7/023; B62D 7/16; B62D 7/163; B62D 21/02;
(Continued)

(56) References Cited

U.S. PATENT DOCUMENTS 8,226,097 B2 7/2012 Kudla et al.
2003/0107200 A1* 6/2003 Huang ..................... B62D 3/12
74/498
(Continued)

FOREIGN PATENT DOCUMENTS

DE 102005045296 A1 4/2007
DE 102006048946 A1 4/2008
(Continued)

OTHER PUBLICATIONS

DE 102005045296 electronic translation, obtained from espacenet.com Apr. 20, 2022 (Year: 2022).*

*Primary Examiner* — Karen Beck
(74) *Attorney, Agent, or Firm* — THE WEBB LAW FIRM

(57) ABSTRACT

The invention relates to an axle support, also referred to as a subframe, for a motor vehicle, having at least two longitudinal members, at least one cross member joining together the longitudinal members, at least two attachment points for attaching a steering gear housing to the axle support and a device for positioning the steering gear housing on the axle support prior to mounting of the steering gear housing on the axle support. In order for such an axle support to offer a cost-effective and rapid positioning of a steering gear housing, the device for positioning the steering gear housing according to the invention has at least two mounts, one mount of which being attached to one of the longitudinal members and/or the cross member and another mount of the mounts being attached to another of the longitudinal members and/or the cross member, wherein the respective mount has at least two indentations for receiving positioning protrusions provided on the steering gear housing.

17 Claims, 10 Drawing Sheets

(51) Int. Cl.
*B62D 21/11* (2006.01)
*B62D 21/15* (2006.01)

(58) Field of Classification Search
CPC ........ B62D 21/09; B62D 21/11; B62D 21/12;
B62D 21/155; B62D 65/02
See application file for complete search history.

(56) References Cited

U.S. PATENT DOCUMENTS

| | | | |
|---|---|---|---|
| 2011/0062677 A1* | 3/2011 | Kudla | B62D 21/11 |
| | | | 280/124.109 |
| 2013/0168939 A1* | 7/2013 | Buschjohann | B62D 3/12 |
| | | | 280/124.109 |
| 2018/0180161 A1* | 6/2018 | Hollman | B60K 17/04 |
| 2019/0118863 A1* | 4/2019 | Hara | B62D 25/20 |

FOREIGN PATENT DOCUMENTS

| | | | | |
|---|---|---|---|---|
| DE | 102012018559 A1 * | 5/2014 | ............... | B62D 3/12 |
| DE | 102012018559 A1 | 5/2014 | | |
| EP | 3650312 A1 | 5/2020 | | |
| JP | H343077 U | 4/1991 | | |
| JP | 2004182170 A * | 7/2004 | | |
| JP | 200940200 A | 2/2009 | | |
| JP | 2020050186 A * | 4/2020 | | |
| KR | 100834599 B1 * | 6/2008 | | |

\* cited by examiner

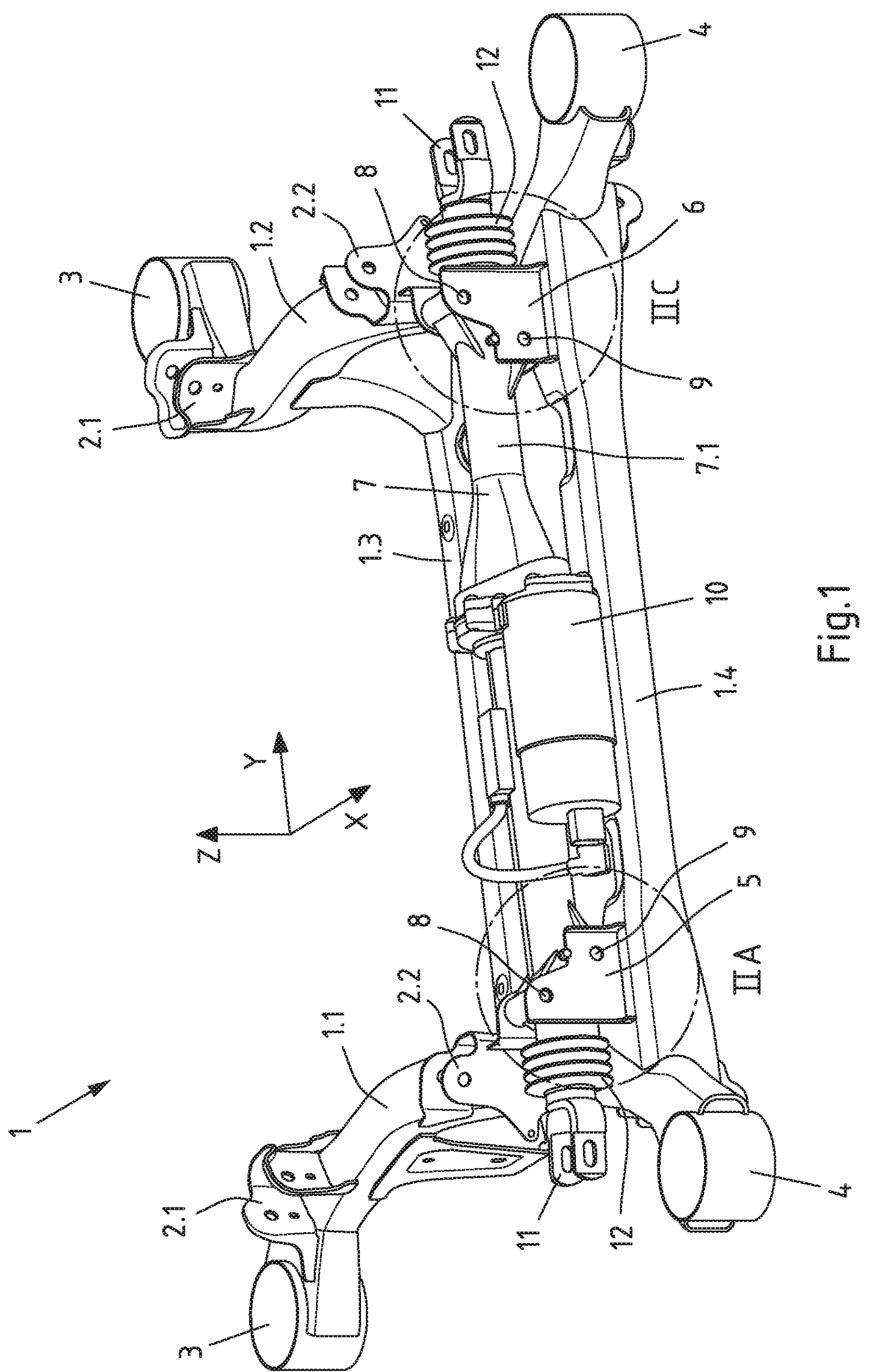

1

AXLE SUPPORT WITH DEVICE FOR POSITIONING A STEERING GEAR

CROSS-REFERENCE TO RELATED APPLICATION

This application claims priority to European Patent Application No. 18204483.4 filed Nov. 6, 2018, the disclosure of which is hereby incorporated by reference in its entirety.

BACKGROUND OF THE INVENTION

Field of the Invention

The invention relates to an axle support, also referred to as a subframe, for a motor vehicle, having at least two longitudinal members, at least one cross member joining together the longitudinal members, at least two attachment points for attaching a steering gear housing to the axle support and a device for positioning the steering gear housing on the axle support prior to mounting of the steering gear housing on the axle support.

Description of Related Art

Steering gears for motor vehicles are normally screw-fastened in the vertical direction of the motor vehicle (z-direction) to the axle support of the respective motor vehicle (see, for example, US 2011/0062677 A1).

A subframe arrangement for a motor vehicle, which provides for screwing of the steering gear housing to the subframe aligned in the motor vehicle longitudinal direction (x-direction) is known from DE 10 2006 048 946 A1.

A device for positioning a steering gear and securing it to a motor vehicle body is known from DE 10 2012 018 559 A1. The device has a subframe supported on the motor vehicle frame, adjusting pins, which are releasably connectable to the subframe such that in the mounted state they are aligned in the motor vehicle longitudinal direction, and a plurality of screw connections aligned in the motor vehicle longitudinal direction, via which the steering gear is attachable to the subframe, wherein on the steering gear contact surfaces associated with the adjusting pins are arranged, via which the position of the steering gear in the motor vehicle vertical direction and in the motor vehicle transverse direction is determined. To this end, the subframe has positioning holes, in which the adjusting pins are insertable. Once the steering gear has been screw-fastened to the subframe the adjusting pins are removed. The insertion and subsequent removal of the adjusting pins in the known device requires considerable effort. In addition, there seems to be room for further improvement in the positioning of the steering gear relative to the subframe.

On this basis, the object of the present invention is to create an axle support of the abovementioned type, which offers an economical and rapid positioning of a steering gear.

SUMMARY OF THE INVENTION

The axle support according to the invention has at least two longitudinal members, at least one cross member joining together the longitudinal members, at least two attachment points for attaching a steering gear housing to the axle support and a device for positioning the steering gear housing to the axle support prior to mounting of the steering gear housing on the axle support. According to the invention, the device for positioning the steering gear housing has at least two mounts, one mount of which being connected to one of the longitudinal members and/or the cross member and another mount of which being connected to another of the longitudinal members and/or the cross member, wherein the respective mount has at least two indentations for receiving positioning protrusions provided on the steering gear housing.

Preferably on the axle support according to the invention the indentations for receiving the positioning protrusions are formed in upward-pointing edges of the mounts. The indentations can also be referred to as positioning holes or notches. The longitudinal members and/or the at least one cross member of the axle support according to the invention are preferably made from sheet metal or implemented as tubular hollow bodies.

Unlike the device known from DE 10 2012 018 559 A1, the axle support according to the invention requires no additional auxiliary tools, such as for example adjusting pins, for the positioning of the steering gear. On the contrary, using the positioning protrusions provided thereon, the steering gear housing can be inserted directly in the indentations of the mounts, whereby the steering gear is immediately positioned relative to the axle support. As a consequence, the steering gear or the steering gear housing, is immediately positioned relative to the axle support in the y-direction (motor vehicle transverse direction), in the x-direction (motor vehicle longitudinal direction) and in the z-direction (motor vehicle vertical direction). The steering gear housing can then be attached to the axle support using screws.

An advantageous embodiment of the invention is characterised in that the attachment points for attaching the steering gear housing are arranged in the mounts having the indentations for receiving the positioning protrusions. This embodiment enables a reduction in components and production steps, thereby allowing a reduction in the cost of manufacturing the axle support and the associated tolerances, and in particular the tolerance chains resulting from a number of different tolerances.

For a rapid and stable positioning of the steering gear housing relative to the axle support it is advantageous if according to a further preferred embodiment of the invention at least one of the indentations for receiving one of the positioning protrusions has a V-shaped, concave or arc-shaped inner contour.

A further advantageous embodiment of the invention is characterised in that at least one of the indentations for receiving one of the positioning protrusions has a straight inner contour section, constituting a middle section of the inner contour of the indentation. This embodiment allows small tolerances in the distance between the positioning protrusions in the y-direction (motor vehicle transverse direction) and/or in the z-direction (motor vehicle vertical direction). Preferably, this embodiment is combined with the abovementioned embodiment of the invention, so that, by way of example, on one end of the steering gear housing at least one of the indentations for receiving one of the positioning protrusions has a V-shaped, concave or arc-shaped inner contour, while at the other end of the steering gear housing one or more of the indentations for receiving the positioning protrusions in each case has a straight inner contour section, constituting a middle section of the inner contour of the indentation.

According to a further embodiment of the invention, the attachment points for fastening the steering gear housing are implemented as through-holes in the mounts having the indentations for receiving the positioning protrusions. The through-holes allow a convenient and reliable attachment of a steering gear housing to the axle support by means of screws that can be inserted or screwed into the through-holes.

In this connection, a further embodiment of invention provides that the through-holes in the mount, at least one indentation for receiving one of the positioning protrusions of which has a straight inner contour section, constituting a middle section of the inner contour of the indentation, are implemented as longitudinal holes, wherein the longitudinal axis of the longitudinal holes runs substantially parallel to the straight inner contour section of the indentation. This embodiment allows certain tolerances in the flush alignment of the through holes in the mount relative to the through holes or threaded holes in or on the steering housing associated with these through holes.

A further embodiment of the invention is characterised in that at least one of the through holes in the mount is provided with an internal thread or with a nut having a positive-bonding and/or form-fitting connection with the mount. In this way a very simple and convenient attachment of a steering gear housing to the axle support can be achieved. Here, the nut having a positive-bonding and/or form-fitting connection with the mount can, by way of example, be implemented as a standard nut, punching nut or weld nut.

According to a further advantageous embodiment of the invention, the mounts are formed as sheet metal shaped parts. Mounts implemented in this way are characterised in that they are very good suited to be fastened to the axle support which, in particular with a complex-shaped connecting surface of the axle support, is an advantage. In addition, such mounts can be economically manufactured so that they have a low component-weight. Preferably each of the mounts is formed by at least two sheet metal shaped parts or has at least two webs, wherein the sheet metal shaped parts or webs have at least two of the through-holes as flush-aligned through-holes.

The mounts for attaching the steering gear to the axle support according to the invention can also be referred to as brackets or implemented as such.

A further advantageous embodiment of the invention provides that at least one of the mounts, having the indentations for receiving the positioning protrusions, has at least two pairs of through holes as attachment points for attaching the steering gear housing. In this way, a particularly stable attachment of the steering gear housing to the axle support can be achieved. Preferably, the at least two pairs of through holes are arranged displaced from one another in the y-direction (motor vehicle transverse direction) and/or in the z-direction (motor vehicle vertical direction).

The axle support according to the invention can, according to a further embodiment of the invention, be equipped with a or the steering gear housing, provided with positioning protrusions, received in the indentations.

According to a preferred embodiment of the invention, the positioning protrusions have a peg-shaped, by way of example substantially circular cylindrical design.

For a stable positioning of the steering gear on the axle support, it is advantageous if according to a further embodiment of the invention the steering gear housing is provided with at least two pairs of positioning protrusions, wherein the positioning protrusions of the respective pair protrude in opposing directions from the steering gear housing.

BRIEF DESCRIPTION OF THE DRAWINGS

The invention is explained in more detail below using a drawing representing several exemplary embodiments. The drawing shows as follows:

FIG. 1 an axle support according to the invention with a steering gear in a perspective representation;

DESCRIPTION OF THE INVENTION

Figure 2A:
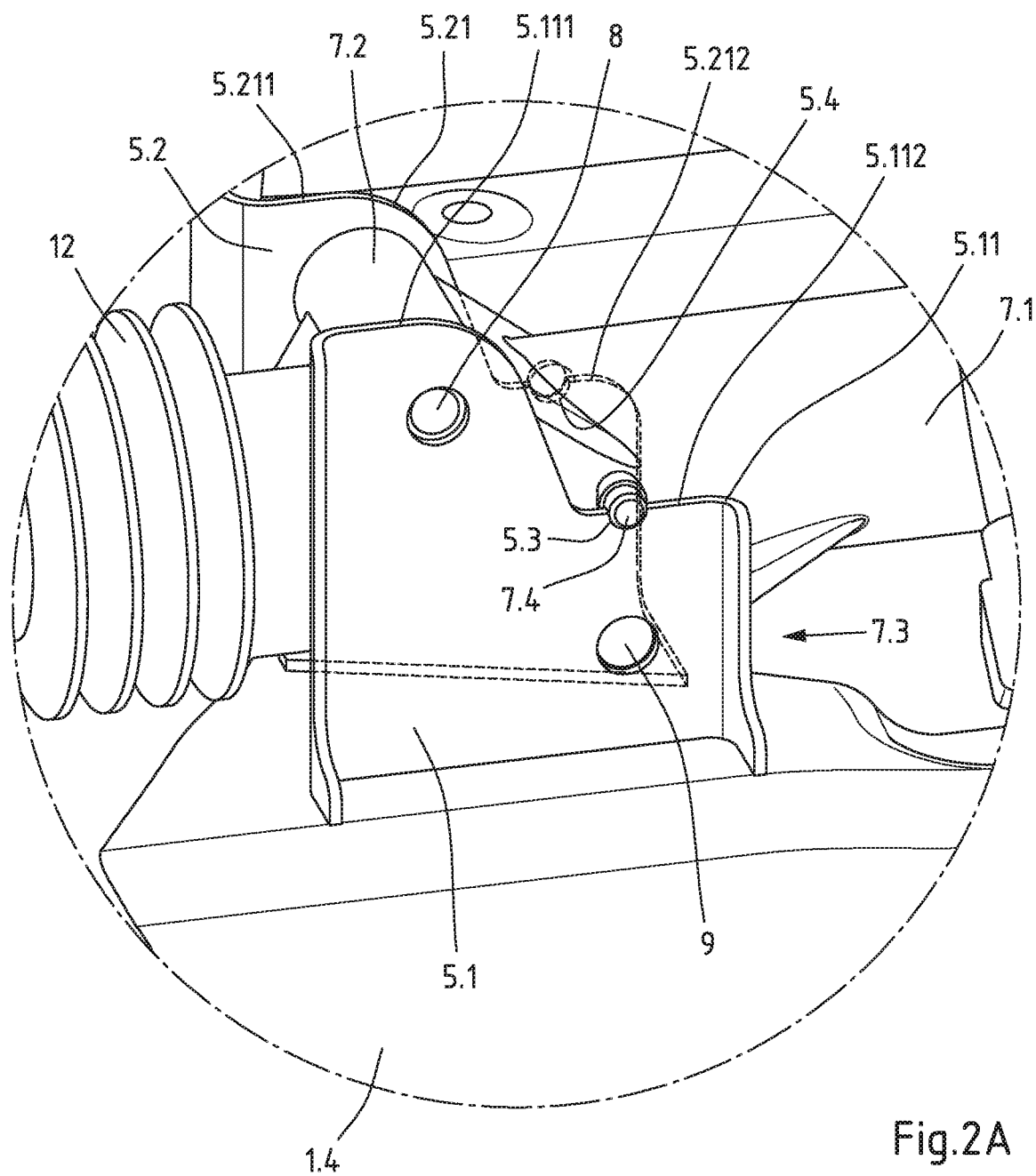
FIG. 2A an enlarged perspective representation of detail IIA from FIG. 1.
Figure 2B:
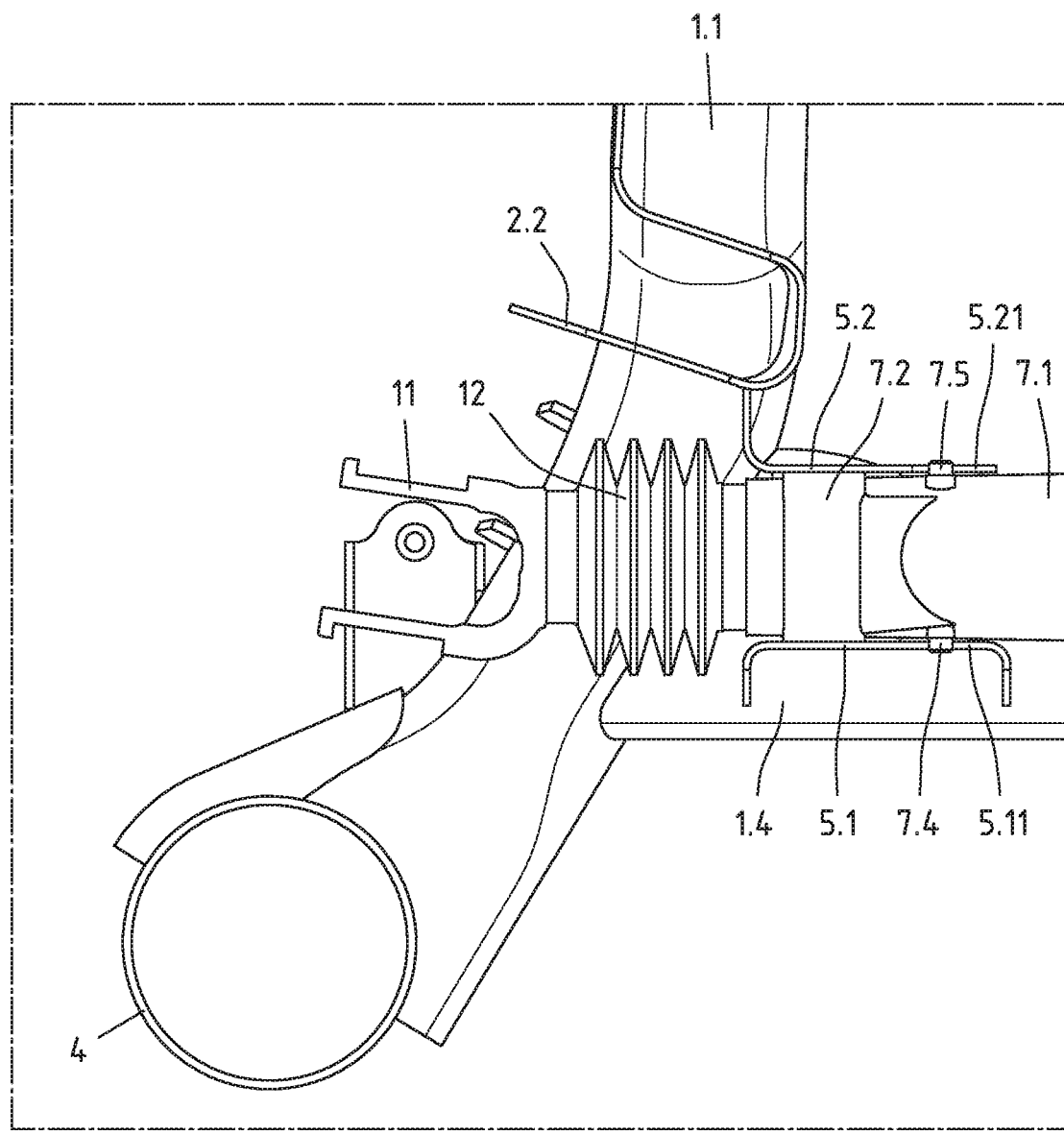
FIG. 2B a section of the axle support from FIG. 1 with detail IIA in top view.

FIG. 1 shows an axle support 1 for a motor vehicle. The axle support 1 has longitudinal members 1.1, 1.2 spaced apart from each other, which in the fully assembled state of the axle support 1 extend substantially in the longitudinal direction (x-direction) of the motor vehicle. The longitudinal members 1.1, 1.2 are joined together by cross member 1.3, 1.4, which are spaced apart from each other in the motor vehicle longitudinal direction. Brackets 2.1, 2.2 are attached, preferably welded, to the longitudinal members 1.1, 1.2, which serve for the articulated connection of chassis components (wishbones) (not shown here). The axle support 1 has front and rear attachment points 3, 4, at which it can be fastened to the vehicle body by means of a plurality of screw connections.

Furthermore, the axle support 1 is provided with mounts 5, 6 for fastening a steering gear 7. The mounts 5, 6 are preferably configured as sheet metal shaped parts 5.1, 5.2, 6.1, 6.2, which are firmly attached, by way of example welded, to the axle support 1. The mounts 5, 6 or sheet metal shaped parts 5.1, 5.2, 6.1, 6.2, which may also be referred to as brackets, are preferably made from sheet steel and by way of example connected in proximity to the longitudinal members 1.1, 1.2 to the ends of the cross member 1.4. In the exemplary embodiment shown in FIG. 1 to FIG. 2D, the respective mount (bracket) 5, 6 is configured from two sheet metal shaped parts 5.1, 5.2, 6.1, 6.2 or has two webs, wherein the webs or sheet metal shaped parts 5.1, 5.2, 6.1, 6.2 have through-holes 8, 9 for fastening the steering gear housing 7.1.

The steering gear 7 is, by way of example, a steering gear of a power steering system. On the steering gear housing 7.1 in this case an electric motor or electro-hydraulic motor-pump unit 10 is mounted, by means of which the steering force applied by the driver is amplified. In the tubular steering gear housing 7.1 a steering rack or piston rod is arranged, which is powered by means of the electric motor or motor-pump assembly 10 and on the ends of which articulated components 11 for attaching steering track rods are mounted. Between the forked articulated components 11 and the steering gear housing 7.1 bellows 12 are arranged, which are in each case connected with one of the two articulated components 11 and the steering gear housing 7.1.

The steering gear housing 7.1 is provided with attachment points 7.2, 7.3 for receiving threaded bolts (not shown) in a form-fitting manner. The attachment points 7.2, 7.3 are by way of example configured as bearing eyes or bearing sleeves and connected by material bonding connection to the steering gear housing 7.1. These attachment points 7.2, 7.3 are preferably arranged on the underside and on the upper surface of the steering gear housing 7.1. Here, the attachment points 7.2, 7.3 are arranged on the respective end of the steering gear housing 7.1 preferably offset in the housing longitudinal direction, wherein by way of example the attachment points 7.2 are arranged on the upper surface further apart from each other than the attachment points 7.3. arranged on the underside of the housing.

Figure 2C:
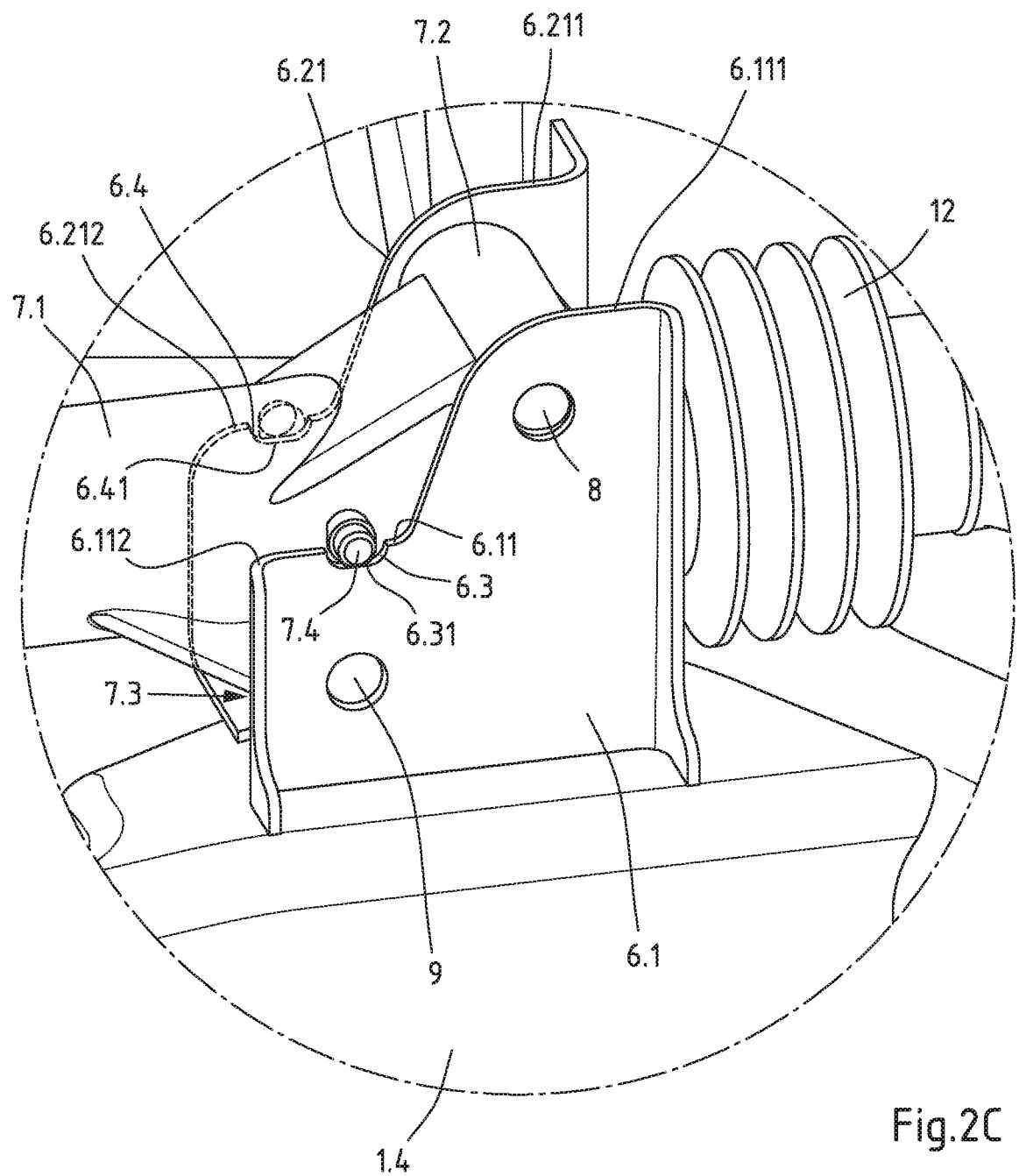
FIG. 2C an enlarged perspective representation of detail IIC from FIG. 1.
Figure 2D:
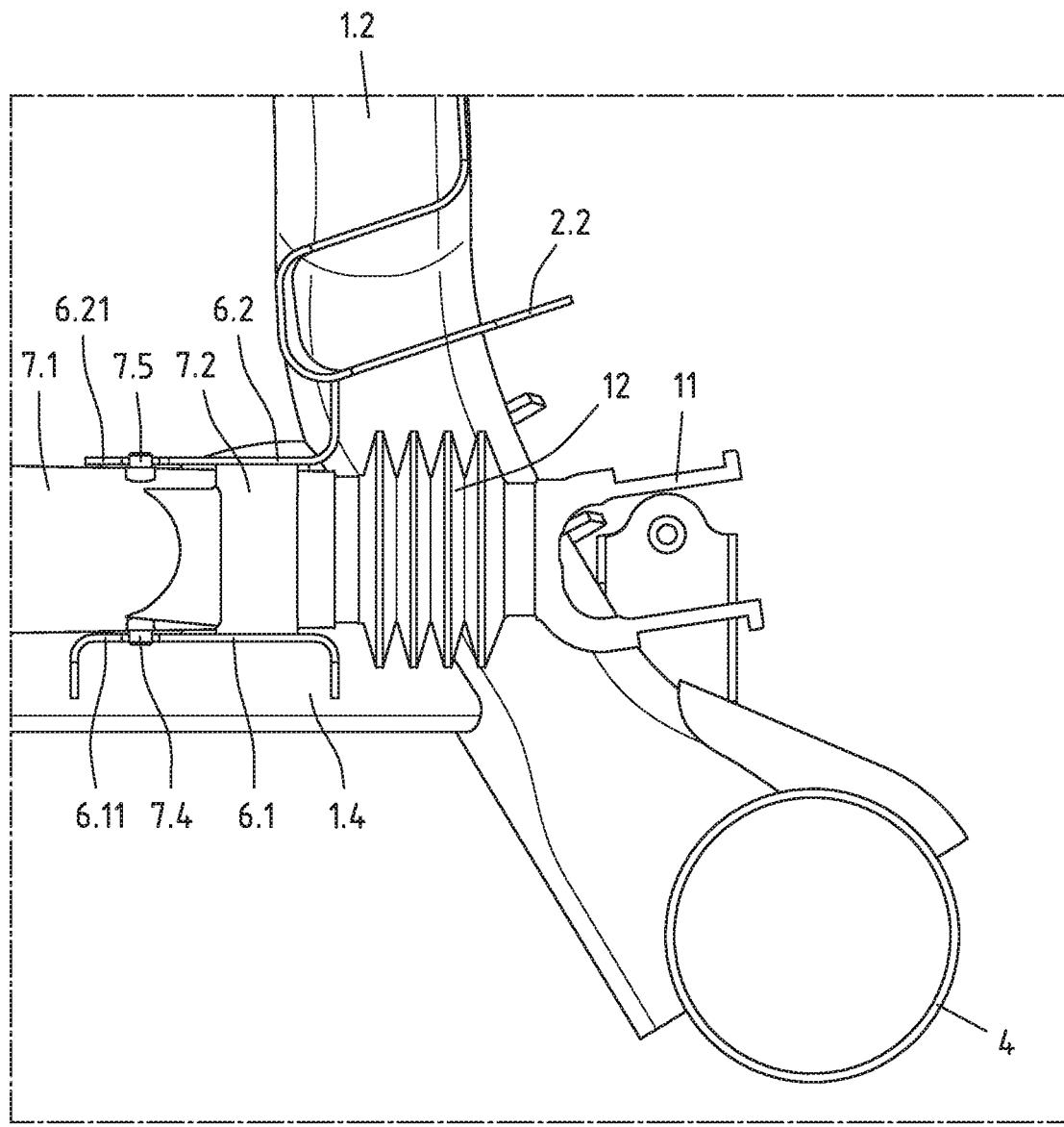
FIG. 2D a section of the axle support from FIG. 1 with detail IIC in top view.

The mounts 5, 6 associated with the steering gear 7 in the exemplary embodiment of the axle support 1 shown in FIG. 1 to FIG. 2D in each case have two pairs of flush-aligned through holes 8, 9 for fastening the steering gear housing 7.1. Threaded bolts insertable in the through-holes 8, 9 are secured by nuts (not shown), by way of example with standard nuts. However, it is also within the scope of the invention, that at least one of the through-holes 8, 9 in the respective mount 5, 6 is provided with an internal thread or with a nut having a material bonding connection and/or form-fitting connection with the mount 5, 6.

Furthermore, the axle support 1 comprises a device for positioning the steering gear housing 7.1 on the axle support, by means of which the steering gear housing 7.1 prior to mounting can be accurately positioned on the axle support, so that the steering gear housing 7.1 can then in a simple and therefore convenient manner be fastened to the axle support 1. The device for positioning the steering gear housing 7.1 is incorporated into the mounts (brackets) 5, 6.

The distance between the webs or sheet metal shaped parts 5.1, 5.2 and 6.1, 6.2, respectively, of the respective mount 5, 6 is selected or dimensioned so that the attachment points 7.2, 7.3 of the steering gear housing 7.1 configured, by way of example, in the form of bearing eyes or bearing sleeves, can be inserted with very little play in the x-direction (motor vehicle longitudinal direction), relative to the webs or sheet metal shaped parts 5.1, 5.2, 6.1, 6.2, in the mounts 5, 6. Here, the respective mount 5, 6, has at least two indentations 5.3, 5.4, 6.3, 6.4 for receiving positioning protrusions 7.4, 7.5 provided on the steering gear housing 7.1. The indentations 5.3, 5.4, 6.3, 6.4 are configured in upward-pointing edges 5.11, 5.21, 6.11, 6.21 of the mounts 5, 6.

The steering gear housing 7.1 is, by way of example, provided with two pairs of positioning protrusions 7.4, 7.5, wherein the positioning protrusions 7.4, 7.5 of the respective pair protrude in opposite directions from the steering gear housing 7.1. The positioning protrusions 7.4, 7.5 preferably have a peg-shaped, by way of example substantially circular cylindrical, design.

The indentations 5.3, 5.4 for receiving the positioning protrusions 7.4, 7.5 configured on one of the mounts, for example mount 5, have a concave or arc-shaped inner contour (cf. FIG. 2A). These indentations 5.3, 5.4 are configured and dimensioned so that the positioning protrusions 7.4, 7.5 associated with them can be inserted in them without play or almost without play. By way of example, the radius of the arc-shaped inner contour can substantially correspond to the radius of the external diameter of the associated circular cylindrical positioning protrusion 7.4, 7.5 or be slightly bigger than the latter radius.

On the other hand, the indentations 6.3, 6.4 for receiving the positioning protrusions 7.4, 7.5 configured on the other mount, for example the mount 6, preferably in each case have a straight inner contour section 6.31, 6.41, which constitutes a middle section of the inner contour of the indentation 6.3, 6.4 concerned (cf. FIG. 2C). The straight inner contour section 6.31, 6.41 merges, by way of example, into concave or arched, e.g. arc-shaped inner contour sections. These indentations 6.3, 6.4 are configured and dimensioned so that the associated positioning protrusions 7.4, 7.5 can be inserted in these with play in the y-direction (motor vehicle transverse direction). The play allows production tolerances in the distance of the indentations 5.3, 5.4 relative to the indentations 6.3, 6.4 or the positioning protrusions 7.4, 7.5 in the y-direction.

Figure 4A:
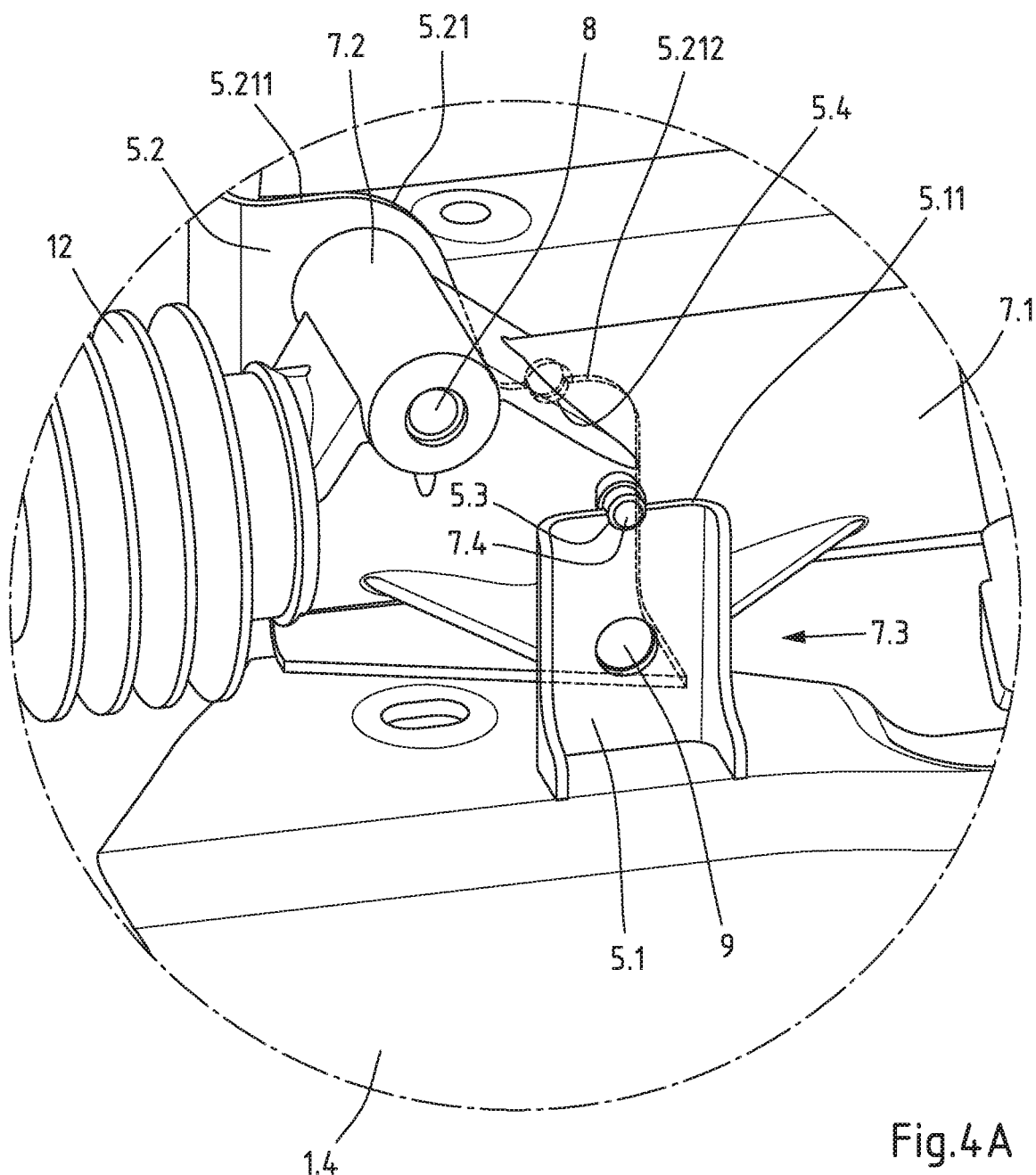
FIG. 4A an enlarged perspective representation of detail IVA from FIG. 3.
Figure 4B:
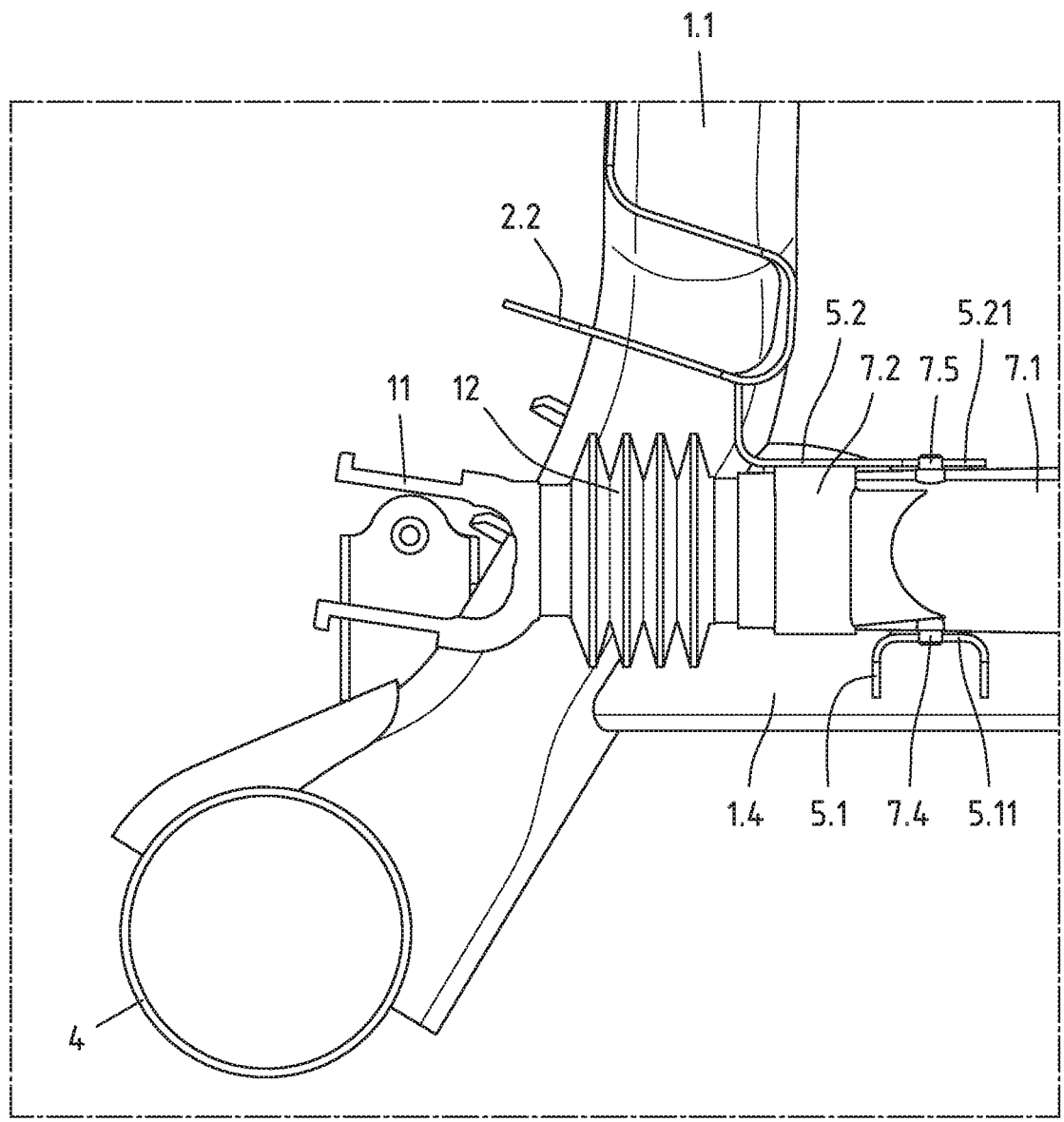
FIG. 4B a section of the axle support from FIG. 3 with detail IVA in top view.
Figure 4C:
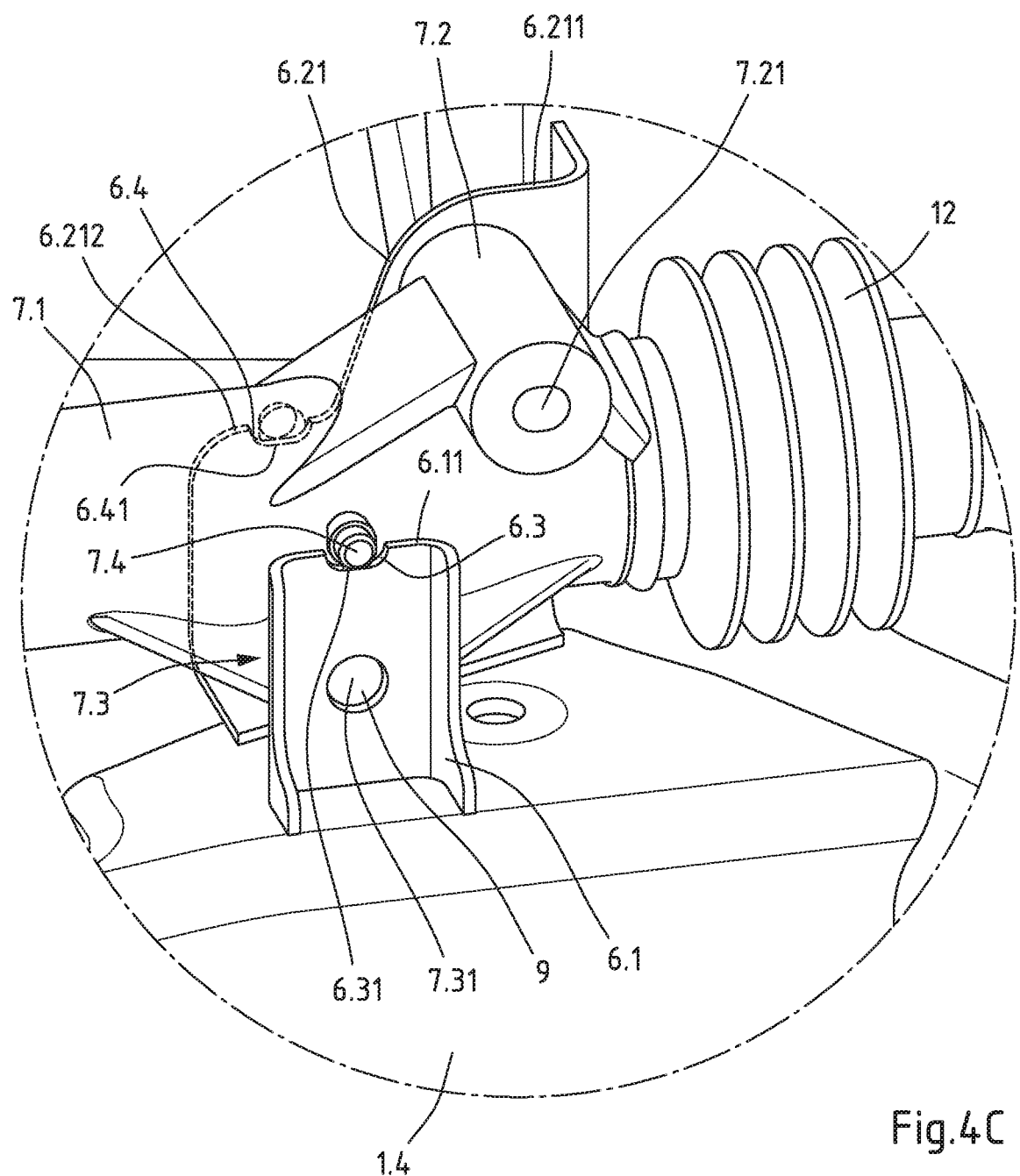
FIG. 4C an enlarged perspective representation of detail IVC from FIG. 3.

The through-holes 8, 9 in the mount 6, the indentations 6.3, 6.4 of which in each case have a straight inner contour section 6.31, 6.41, constituting a middle section of the inner contour of the indentation 6.3, 6.4 concerned, are implemented as longitudinal holes. Here, the longitudinal axis of the respective longitudinal hole 8, 9 runs substantially parallel to the straight inner contour section 6.31, 6.41 of the indentation 6.3, 6.4 adjacent to the longitudinal hole 8, 9. Alternatively or in addition, the through-holes 7.21, 7.31 arranged in the attachment points 7.2, 7.3 of the steering gear housing 7.1 can also be configured as longitudinal holes (cf. FIG. 4C).

Furthermore, the webs or sheet metal shaped parts 5.1, 5.2, 6.1, 6.2 of the respective mount 5, 6 are, by way of example, configured so that they have sections of different heights. The webs or sheet metal shaped parts 5.1, 5.2, 6.1, 6.2 thus have on their upward-pointing edge 5.11, 5.21, 6.11, 6.21, a step, which is defined by a higher edge section 5.111, 5.211, 6.111, 6.211 and a lower edge section 5.112, 5.212, 6.112, 6.212. Here, the indentations 5.3, 5.4, 6.3, 6.4 for receiving the positioning protrusions 7.4, 7.5 are preferably arranged on the lower edge sections 5.112, 5.212, 6.112, 6.212 (cf. FIG. 1, FIG. 2A, FIG. 2C). In addition, the indentations 5.3, 5.4, 6.3, 6.4 lie in edge regions of the mounts 5, 6, wherein these edge regions are intersected by verticals which also intersect the lower through-holes 9. In other words, the indentations are arranged vertically above the lower through holes 9 (cf. FIG. 2A and FIG. 2C).

Figure 3:
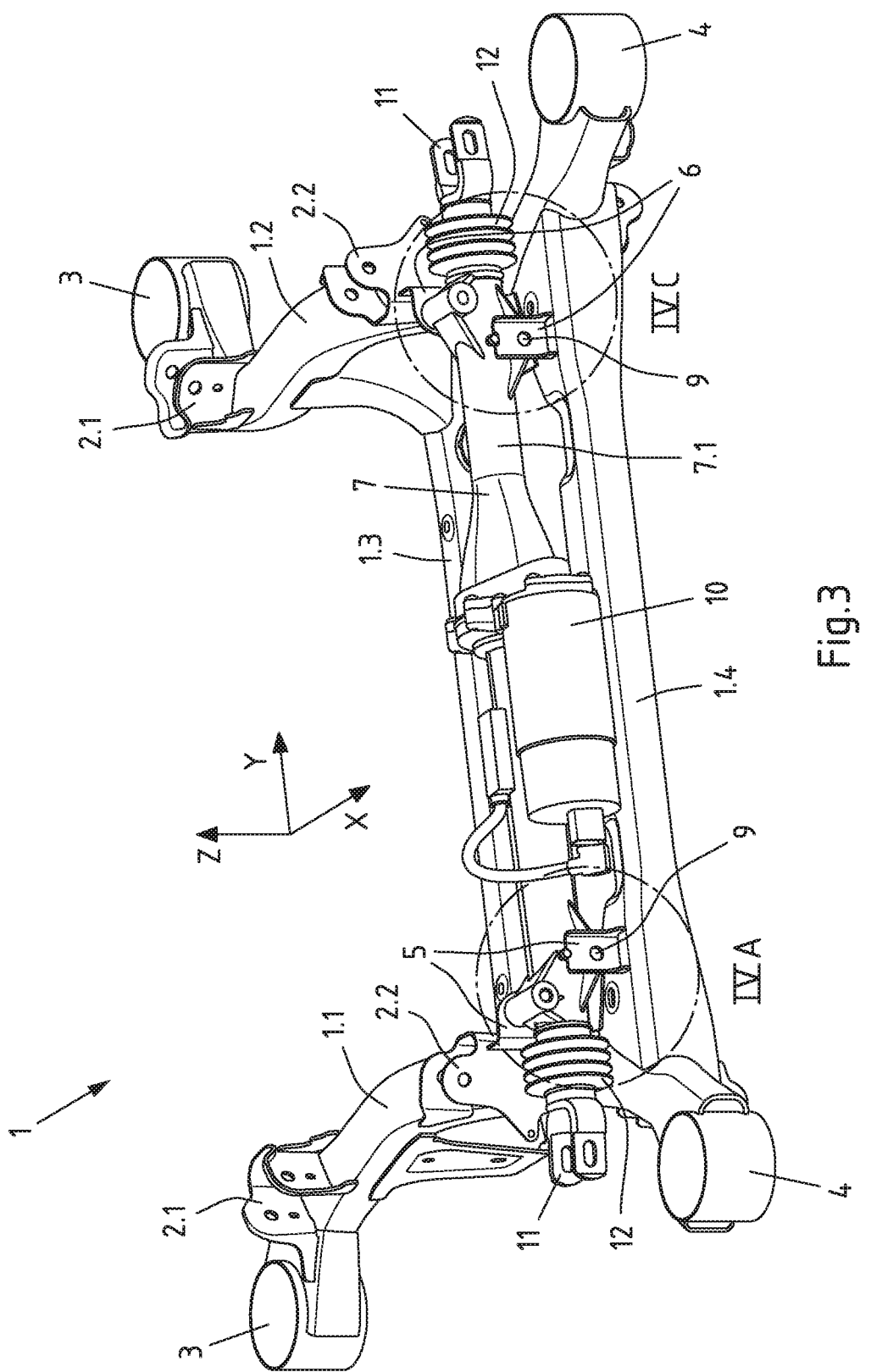
FIG. 3 a further axle support according to the invention in the form of a subframe with a steering gear in a perspective representation.
Figure 4D:
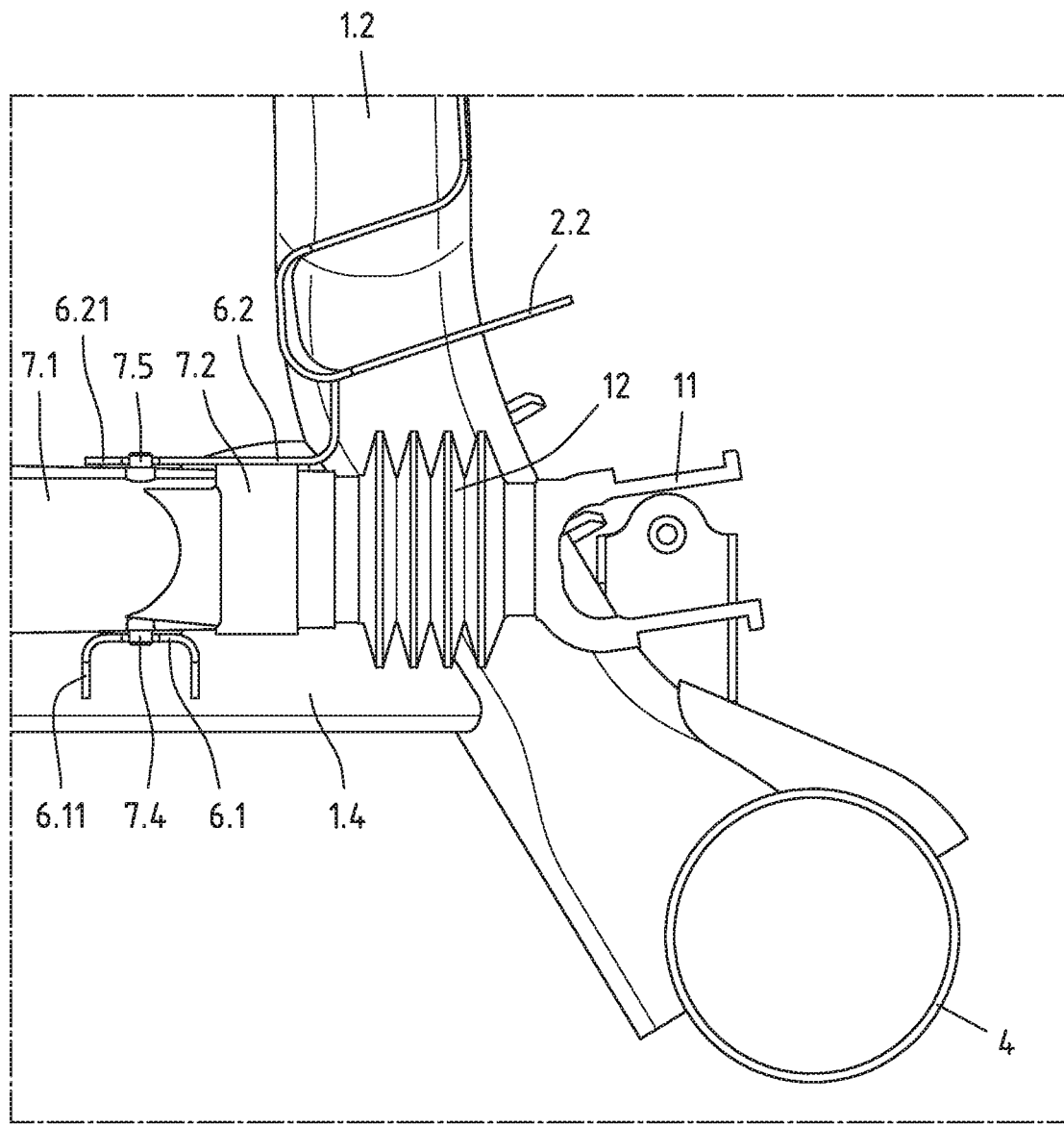
FIG. 4D a section of the axle support from FIG. 3 with detail IVC in top view.

The exemplary embodiment of invention shown in FIG. 3 to FIG. 4D differs from the exemplary embodiment shown in FIG. 1 to FIG. 2D merely by the design of the mounts (brackets) 5, 6. Here, in turn, the respective mount 5, 6 is also formed by two sheet metal shaped parts 5.1, 5.2, 6.1, 6.2 or has two webs, wherein the webs or sheet metal shaped parts 5.1, 5.2, 6.1, 6.2 have through-holes 9 for fastening the steering gear housing 7.1. However, the mount 5, 6 has only two flush-aligning through-holes 9 for insertion or screwing-in of a threaded bolt. One web or one sheet metal shaped part 5.1, 6.1 of the mount 5, 6 is formed along its upper edge with a substantially constant height, whereas the other sheet metal shaped part 5.2, 6.2 of the mount 5, 6 (as in the exemplary embodiment shown in FIG. 1 to FIG. 2D) has sections of differing height. This means that this sheet metal shaped part 5.2, 6.2 similarly has on its upward-facing edge 5.21, 6.21 a step, which is defined by an upper edge section 5.211, 6.211 and a lower edge section 5.212, 6.212. In addition, this sheet metal shaped part 5.2, 6.2 has a second or upper through-hole 8 for fastening of the steering gear housing 7.1. The attachment point 7.2 of the steering gear housing 7.1 associated with the through-hole 8, which attachment point for example is implemented in the form of a bearing sleeve, can have a longitudinal hole for insertion of a threaded bolt (not shown) or an internal thread for screwing-in a threaded bolt (not shown).

The implementation of the invention is not restricted to the exemplary embodiments represented in the drawing. On the contrary, numerous variants are conceivable, which make use of the invention indicated in the claims in a design that differs from the examples shown. Thus, by way of example, the mounts 5, 6 of steering gear 7 may also be connected only to the longitudinal members 1.1, 1.2 or both to the cross member 1.4 and the longitudinal members 1.1, 1.2. Furthermore, the indentations 5.3, 5.4 for receiving the positioning protrusions 7.4, 7.5 in a form-fitting manner, can also have a V-shaped inner contour instead of a concave or arc-shaped inner contour.

The invention claimed is:

1. An axle support for a motor vehicle, comprising:
   at least two longitudinal members,
   at least one cross member joining together the longitudinal members, at least two attachment points for attaching a steering gear housing to the axle support and
   a device for positioning the steering gear housing on the axle support prior to mounting of the steering gear housing on the axle support,
   wherein the device for positioning the steering gear housing has at least two mounts, one mount of which being attached to one of the longitudinal members and/or the cross member and another mount of the mounts being attached to another of the longitudinal members and/or the cross member, wherein the respective mount has at least two indentations for receiving positioning protrusions provided on the steering gear housing, wherein the steering gear housing is provided with at least two pairs of positioning protrusions, and
   wherein the said positioning protrusions of the respective pair protrude in opposing directions from the steering gear housing.

2. The axle support according to claim 1,
   wherein the attachment points for attaching the steering gear housing are arranged in the mounts having the indentations for receiving the positioning protrusions.

3. The axle support according to claim 1,
   wherein at least one of the indentations for receiving one of the positioning protrusions has a V-shaped, concave or arc-shaped inner contour.

4. The axle support according to claim 1,
   wherein at least one of the indentations for receiving one of the positioning protrusions has a straight inner contour section, constituting a middle section of the inner contour of the indentation.

5. The axle support according to claim 1,
   wherein the attachment points for fastening the steering gear housing are implemented as through-holes in the mounts having the indentations for receiving the positioning protrusions.

6. The axle support according to claim 5,
   wherein the through-holes in the mount, at least one of the indentations for receiving one of the positioning protrusions of which has a straight inner contour section, which constitutes a middle section of the inner contour of the indentation, are implemented as longitudinal holes, wherein the longitudinal axis of the longitudinal holes runs substantially parallel to the straight inner contour section of the indentation.

7. The axle support according to claim 5,
   wherein at least one of the through-holes is provided in the mount with an internal thread or with a nut having a material bonding connection and/or form-fitting connection with the mount.

8. The axle support according to claim 7,
   wherein the mounts are formed from sheet metal shaped parts.

9. The axle support according to claim 8,
   wherein the respective mount is formed by at least two sheet metal shaped parts or has at least two webs, wherein the sheet metal shaped parts or webs have at least two of the through-holes as flush-aligned through-holes.

10. The axle support according to claim 1,
    wherein the indentations for receiving the positioning protrusions are configured in upward-pointed edges of the mounts.

11. The axle support according to claim 1,
    wherein at least one of the mounts, which has the indentations for receiving the positioning protrusions, has at least two pairs of through holes as attachment points for fastening the steering gear housing.

12. The axle support according to claim 1, wherein the steering gear housing is provided with positioning protrusions and is received in the indentations.

13. The axle support according to claim 12,
    wherein the protrusions are peg-shaped.

14. An axle support for a motor vehicle, comprising:
    at least two longitudinal members,
    at least one cross member joining together the longitudinal members, at least two attachment points for attaching a steering gear housing to the axle support and
    a device for positioning the steering gear housing on the axle support prior to mounting of the steering gear housing on the axle support,
    wherein the device for positioning the steering gear housing has at least two mounts, one mount of which being attached to one of the longitudinal members and/or the cross member and another mount of the mounts being attached to another of the longitudinal members and/or the cross member, wherein the respective mount has at least two indentations for receiving positioning protrusions provided on the steering gear housing,
    wherein said positioning protrusions protrude in opposing directions from the steering gear housing,
    wherein the attachment points for fastening the steering gear housing are implemented as through-holes in the mounts having the indentations for receiving the positioning protrusions, and
    wherein the through-holes in the mount, at least one of the indentations for receiving one of the positioning protrusions of which has a straight inner contour section, which constitutes a middle section of the inner contour of the indentation, are implemented as longitudinal holes, wherein the longitudinal axis of the longitudinal holes runs substantially parallel to the straight inner contour section of the indentation.

15. An axle support for a motor vehicle, comprising:
    at least two longitudinal members,
    at least one cross member joining together the longitudinal members, at least two attachment points for attaching a steering gear housing to the axle support and
    a device for positioning the steering gear housing on the axle support prior to mounting of the steering gear housing on the axle support,
    wherein the device for positioning the steering gear housing has at least two mounts, one mount of which being attached to one of the longitudinal members and/or the cross member and another mount of the mounts being attached to another of the longitudinal members and/or the cross member, wherein the respective mount has at least two indentations for receiving positioning protrusions provided on the steering gear housing, wherein said positioning protrusions protrude in opposing directions from the steering gear housing, wherein the attachment points for fastening the steering gear housing are implemented as through-holes in the mounts having the indentations for receiving the positioning protrusions, wherein at least one of the through-holes is provided in the mount with an internal thread or with a nut having a material bonding connection and/or form-fitting connection with the mount, and wherein the mounts are formed from sheet metal shaped parts.

16. An axle support for a motor vehicle, comprising:

at least two longitudinal members, at least one cross member joining together the longitudinal members, at least two attachment points for attaching a steering gear housing to the axle support and a device for positioning the steering gear housing on the axle support prior to mounting of the steering gear housing on the axle support, wherein the device for positioning the steering gear housing has at least two mounts, one mount of which being attached to one of the longitudinal members and/or the cross member and another mount of the mounts being attached to another of the longitudinal members and/or the cross member, wherein the respective mount has at least two indentations for receiving positioning protrusions provided on the steering gear housing, wherein said positioning protrusions protrude in opposing directions from the steering gear housing, wherein the attachment points for fastening the steering gear housing are implemented as through-holes in the mounts having the indentations for receiving the positioning protrusions, wherein at least one of the through-holes is provided in the mount with an internal thread or with a nut having a material bonding connection and/or form-fitting connection with the mount, wherein the mounts are formed from sheet metal shaped parts, and wherein the respective mount is formed by at least two sheet metal shaped parts or has at least two webs, wherein the sheet metal shaped parts or webs have at least two of the through-holes as flush-aligned through-holes.

17. An axle support for a motor vehicle, comprising:

at least two longitudinal members, at least one cross member joining together the longitudinal members, at least two attachment points for attaching a steering gear housing to the axle support and a device for positioning the steering gear housing on the axle support prior to mounting of the steering gear housing on the axle support, wherein the device for positioning the steering gear housing has at least two mounts, one mount of which being attached to one of the longitudinal members and/or the cross member and another mount of the mounts being attached to another of the longitudinal members and/or the cross member, wherein the respective mount has at least two indentations for receiving positioning protrusions provided on the steering gear housing, wherein said positioning protrusions protrude in opposing directions from the steering gear housing, and wherein the indentations for receiving the positioning protrusions are configured in upward-pointed edges of the mounts.

* * * * *